United States Patent [19]

Straka et al.

[11] Patent Number: 5,723,966
[45] Date of Patent: Mar. 3, 1998

[54] SYSTEM AND METHOD FOR INCREASING THE EFFICIENCY OF ALTERNATING CURRENT INDUCTION MOTORS

[75] Inventors: Richard Stephen Straka; David Maxwell Coombs, both of Phoenix, Ariz.

[73] Assignee: Current Technology, Inc., Phoenix, Ariz.

[21] Appl. No.: 702,267

[22] Filed: Aug. 23, 1996

[51] Int. Cl.$^6$ .................................................. H02P 7/622
[52] U.S. Cl. .......................... 318/650; 318/729; 318/805
[58] Field of Search .................................. 318/650, 727, 318/729, 805, 809

[56] References Cited

U.S. PATENT DOCUMENTS

| | | | |
|---|---|---|---|
| 4,361,792 | 11/1982 | Davis, Jr. et al. | 318/729 |
| 4,413,217 | 11/1983 | Green et al. | 318/729 |
| 4,454,462 | 6/1984 | Spann | 318/729 |
| 4,459,529 | 7/1984 | Johnson | 318/729 |
| 4,581,568 | 4/1986 | Fitzpatrick et al. | 318/729 |
| 4,800,326 | 1/1989 | Unsworth | 318/729 |
| 4,950,970 | 8/1990 | Davis, Jr. et al. | 318/809 |
| 5,153,489 | 10/1992 | Unsworth et al. | 318/490 |
| 5,241,256 | 8/1993 | Hatanaka et al. | 318/801 |
| 5,428,283 | 6/1995 | Kalman et al. | 318/729 |
| 5,442,271 | 8/1995 | Hatanaka et al. | 318/729 |
| 5,592,062 | 1/1997 | Bach | 318/805 |

*Primary Examiner*—Bentsu Ro
*Attorney, Agent, or Firm*—Harry M. Weiss; Jeffrey D. Moy; Harry M. Weiss & Associates, P.C.

[57] ABSTRACT

A system for increasing the efficiency of single and multiphase induction motors. The system is comprised of a microcontroller which combines a time when the AC line current reaches zero amps with a time when AC line voltage to the AC motor reaches zero volts and with a digital measurement provided by an A/D converter to determine a servo error. The servo error determines whether the A/C motor needs more or less power. The microprocessor provides a control signal to a switching means to supply the minimum power required based on the servo error.

17 Claims, 2 Drawing Sheets

SYSTEM AND METHOD FOR INCREASING THE EFFICIENCY OF ALTERNATING CURRENT INDUCTION MOTORS

BACKGROUND OF THE INVENTION

1. Field of the Invention

This invention relates generally to the field of motor controllers and, more specifically, to a programmable system and method for improving the efficiency of AC induction motors by metering the power supplied to the AC induction motor to prevent wasted power.

2. Description of the Related Art

AC induction motors under full load conditions are inherently efficient. Under light loads, AC induction motors are also inherently inefficient. This means that under light loading, a potentially large portion of the power going to a motor is not used to productively drive a load, but instead is wasted as heat or vibration byproducts.

The majority of the systems used to overcome the problem of wasted power in lightly loaded AC induction motors are based on a scheme for correcting or optimizing the power factor to an idealized value. The basis for these schemes are based on the fact that the closer the power factor is brought to an idealized reference value, the smaller the amount of power that will be wasted under light load conditions by heat and vibration. These systems typically use a counter technique which determines the power factor based on the zero value crossings of the voltage and current. The drawback with these systems is that the optimal power factor changes depending on the loading of the motor. Thus, these systems which try to control the reference power factor and ignore the load the motor is under produce systems in which either some amount of power is wasted due to a compromise reference power factor, or if the reference power factor is set to favor saving more power, a sudden large load increase can cause the motor to stall before the controller can correct for the load increase. The optimal power factor is also influenced by the physical construction of the particular motor which will vary due to motor winding variations during construction and design differences among manufacturers. This could result in an aggravation of the problems in controlling the efficiency of AC motors solely by power factor.

Another type of motor controller measures the open circuit voltage across a controlling triac and calculates a current based on the triac open circuit voltage. The problem with these systems is that they can only be used during the start-up phase for controlling the start-up sequence of the induction motor. These systems are not designed to address or correct for energy losses during lightly loaded motor operation.

Therefore, there existed a need to provide an improved system for increasing the efficiency of AC motors. The improved system must be inexpensive and be able to save power during light load operations. The improved system must also be able to meter the power supplied to the motor in order to prevent power from being wasted. The improved system further must be programmable in order to increase the efficiency of different size and types of AC motors.

SUMMARY OF THE INVENTION

In accordance with one embodiment of the present invention, it is an object of the present invention to provide an improved system for increasing the efficiency of AC motors.

It is another object of the present invention to provide an improved system for increasing the efficiency of AC motors that is inexpensive and is able to save power during light load operations.

It is another object of the present invention to provide an improved system for increasing the efficiency of AC motors that is able to meter the power being supplied to the motor in order to prevent power from being wasted.

It is still another object of the present invention to provide an improved system for increasing the efficiency of AC motors that is programmable so that the system is able to increase the efficiency of different size and types of AC motors.

BRIEF DESCRIPTION OF THE PREFERRED EMBODIMENTS

In accordance with one embodiment of the present invention a system for increasing the efficiency of an AC motor is disclosed. The system is comprised of a plurality of elements one of which is switching means coupled to the AC motor for controlling power supplied to the AC motor. Timer means are coupled to the AC motor for monitoring a time when AC line voltage to the AC motor reaches zero volts. Analog to Digital (A/D) converter means are coupled to the timer means for monitoring a time when AC line current to the AC motor reaches zero amps. The A/D converter means is further used for converting an AC open circuit voltage across the switching means from an analog measurement to a digital measurement wherein the digital measurement is indicative of the power actually needed by the A/C motor. Microcontroller means are coupled to the timer means, the A/D converter means, and to the switching means for combining the time when AC line current reaches zero amps with the time when AC line voltage to the AC motor reaches zero volts and with the digital measurement provided by the A/D converter means to determine if the A/C motor needs more or less power and provides a control signal to the switching means to supply the minimum power required.

In accordance with another embodiment of the present invention, a method of providing a system for increasing the efficiency of an AC motor is disclosed. The method comprises the steps of: providing switching means coupled to the AC motor for controlling power supplied to the AC motor; providing timer means coupled to the AC motor for monitoring a time when AC line voltage to the AC motor reaches zero volts; providing A/D converter means coupled to the timer means for monitoring a time when AC line current to the AC motor reaches zero amps and for converting an AC open circuit voltage across the switching means from an analog measurement to a digital measurement wherein the digital measurement is indicative to power actually needed by the A/C motor; and providing microcontroller means coupled to the timer means, to the A/D converter means, and to the switching means for combining the time when AC line current reaches zero amps with the time when AC line voltage to the AC motor reaches zero volts and with the digital measurement provided by the A/D converter means to determining if the A/C motor needs more or less power and provides a control signal to the switching means to supply the minimum power required.

The foregoing and other objects, features, and advantages of the invention will be apparent from the following, more particular, description of the preferred embodiments of the invention, as illustrated in the accompanying drawings.

DESCRIPTION OF THE PREFERRED EMBODIMENTS

Figure 1:
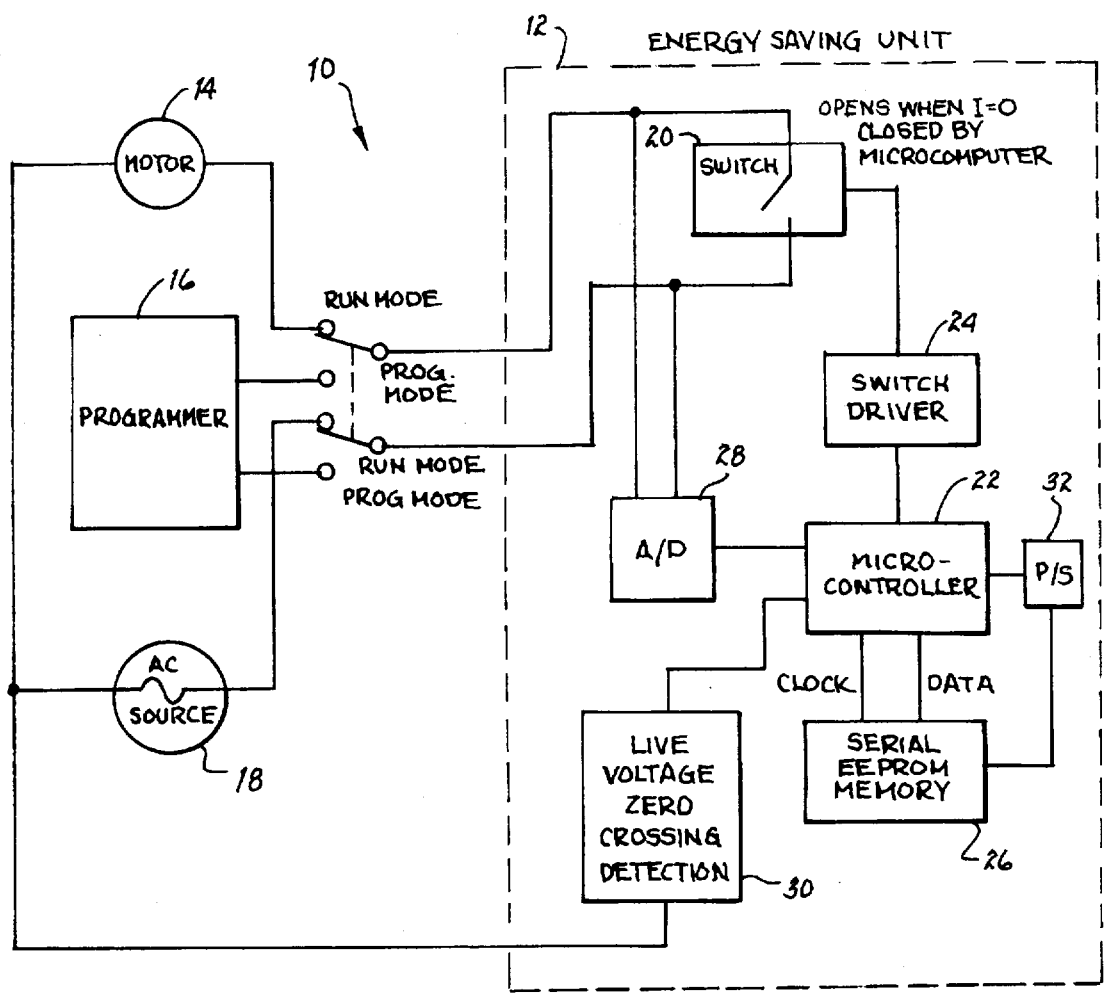
FIG. 1 is a simplified functional block diagram of a programmable system for increasing the efficiency of AC induction motors.

Referring to FIG. 1, a system for increasing the efficiency of AC motors 10 (hereinafter system 10) is shown. The system 10 reduces the excess power that is supplied to lightly loaded AC motors which generally contributes to motor heating and motor vibration.

The system 10 is comprised of a plurality of elements: an energy saving unit 12 which is coupled to an AC motor 14, an AC power source 18 and a system programmer 16. The energy saving unit 12 meters the amount of power supplied to the AC motor 14 from the AC power source 18. The system programmer 16 programs the energy saving unit 12 with control constants selected for a specific AC motor 14.

The energy saving unit 12 meters the power supplied to the AC motor 14 by controlling a duty cycle of a switch 20. The switch 20 connects the hot side of the AC power source 18 to the hot side of the AC motor 14. In the preferred embodiment of the present invention, the switch 20 is a triac. However, it should be noted that other devices could be used. For example back to back SCRs could be utilized. The switch 20 is closed by a signal from the microcontroller 22. The closing signal from the microcontroller 22 is supplied via a switch driver 24. The switch 22 opens itself when the AC current being supplied to the AC motor 14 reverses polarity. The switch driver 24 amplifies the control signal from the microcontroller 22 and optically isolates the microcontroller 22 from the switch 20.

The microcontroller 22 controls the duty cycle of the closing signal based on information supplied from a serial EEPROM memory 26, an analog to digital (A/D) converter 28 and a line voltage zero crossing detection circuit 30.

The serial EEPROM memory 26 contains control constants for the specific AC motor 14 that the system 10 is being used with. The control constants are used by an algorithm programmed into the microcontroller 22.

The line voltage zero crossing detection circuit 30 is used by the microcontroller 22 to detect the time when the line voltage supplied by the AC power source 18 crosses through zero.

The A/D converter 28 senses the motor voltage across the switch 20 any time the switch 20 is in an open state. The motor voltage is generated by the AC motor 14 is indicative of the load actually being driven by the AC motor 14 including frictional losses. The A/D converter 29 takes the value of the motor voltage and converts the value from analog to digital for use by the algorithm within the microcontroller 22. The A/D converter 28 also supplies a time to the microcontroller 22 when the switch 20 changed to an open state. This time denotes when the AC current through the switch 20 reverses polarity.

Figure 2:
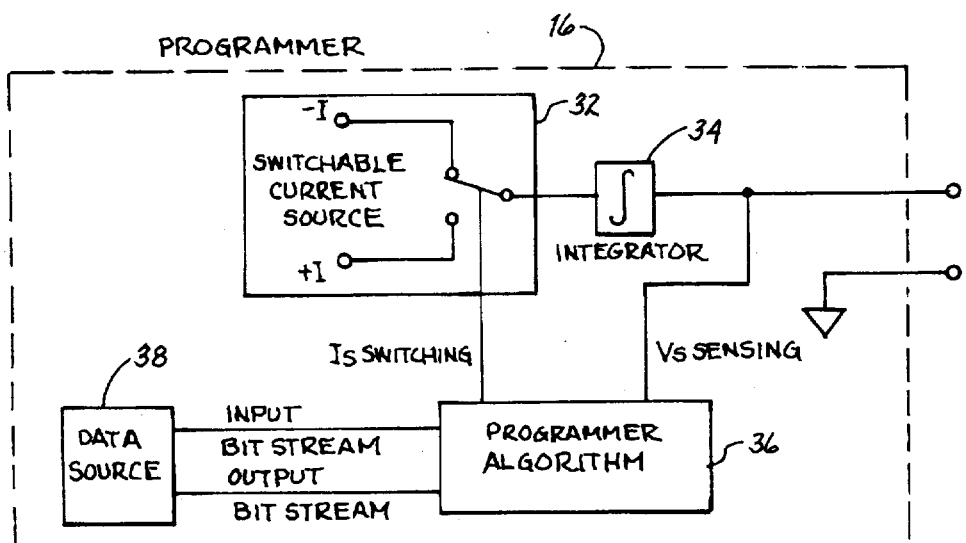
FIG. 2 is a simplified functional block diagram of the programmer used in the system depicted in FIG. 1.

Referring to FIG. 2, the programmer 16 is shown in detail. The programmer 16 programs the control constants into the serial EEPROM memory 26. The control constants originate from the data source 38. The programmer algorithm circuit 36 reads the control constants data from the serial EEPROM memory 26. The programmer algorithm circuit 36 controls the polarity of a switchable current source 32 based on the control constants data. The current is directed to an integrator 34 that produces a voltage signal from the integration of the current supplied from the switchable current source 32. The voltage signal produced by the integrator 34 is fed to the energy saving unit 12. The voltage signal transmits the control constant data in a digital format to the energy saving unit 12 where the microcontroller 22 reads the control constant data by interpreting the voltage signal from the programmer 16.

Figure 3:
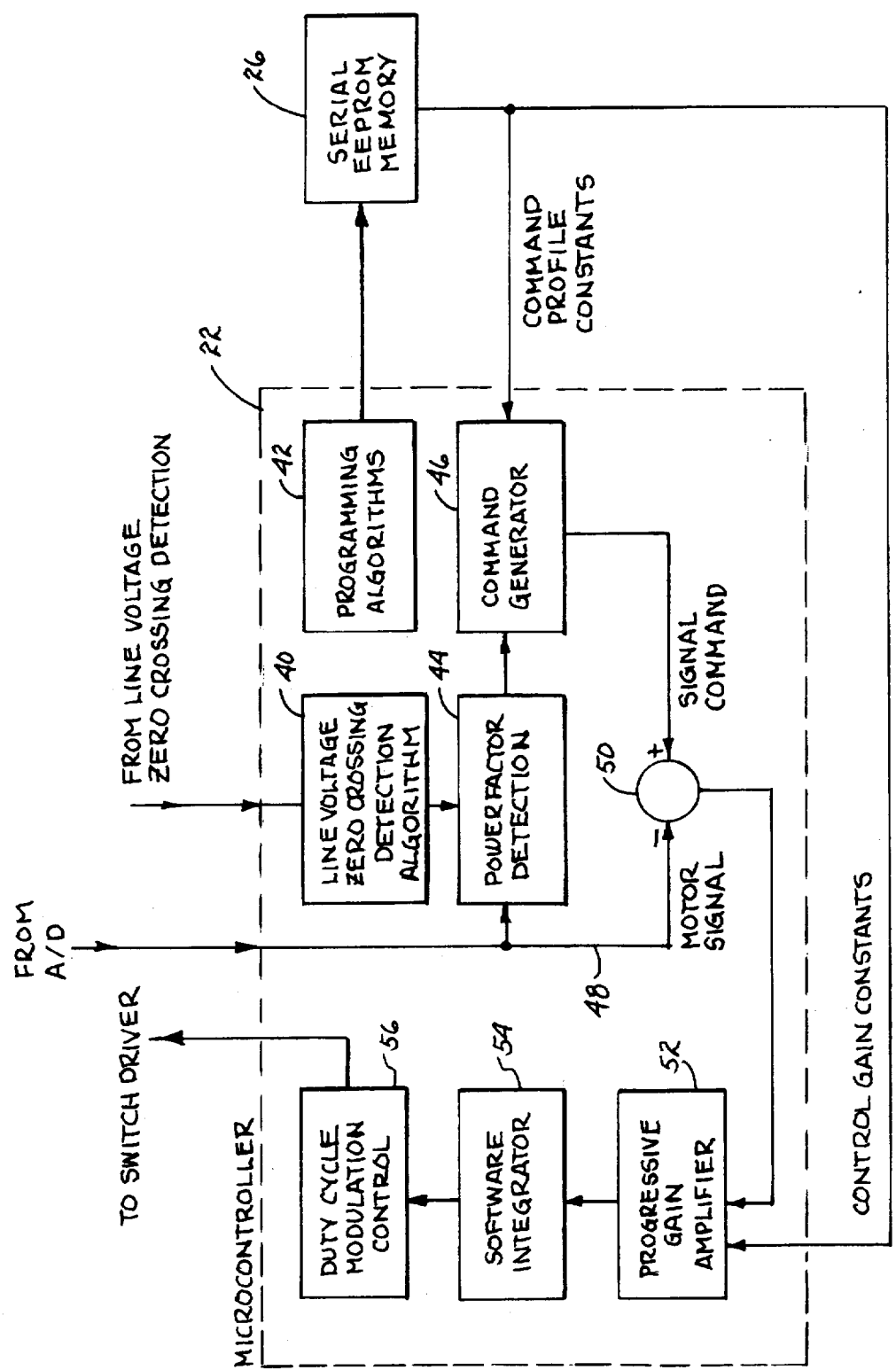
FIG. 3 is a simplified block diagram of the microcontroller algorithm process used in the system depicted in FIG. 1.

Referring to FIG. 3, a simplified block diagram of the microcontroller 22 algorithm process is shown. The line voltage zero crossing circuit 30 (FIG. 1) outputs a signal to the microcontroller 22 when the line voltage crosses zero potential. The zero crossing detection algorithm 40 receives this signal and records a start reference time. The starting reference time information is fed to the power factor detection circuit 44. The power factor detection circuit 44 also receives a signal from the A/D converter 28 (FIG. 1). The A/D converter 28 sends a signal to the power factor detection circuit 44 when the switch 20 (FIG. 1) opens. The power factor detection circuit 44 records a stop reference time at the receipt of this signal. The power factor detection circuit 44 takes the difference between these two times and feeds the result to the command generator 46. The command generator 46 takes the time difference result which is effectively the power factor and performs a data lookup in a table supplied by the serial EEPROM memory 26 at the direction of the programming algorithms 42. The serial EEPROM memory 26 contains data regarding the characteristics of the particular type of AC motor 14 that is being used with the system 10. The result of this lookup is the command signal which is fed to an adder 50. The adder 50 has a second input from the A/D converter 28. The A/D converter 28 measures the voltage being generated by the motor 14 at the time that the switch 20 opens. The adder 50 differences these two signals and sends a servo error signal to a progressive gain amplifier 52. The progressive gain amplifier 52 amplifies the servo error signal based on control gain constants from the serial EEPROM memory 26 at the direction of the programming algorithms 42. The progressive gain amplifier 52 then outputs the amplified servo error to a software integrator 54. The software integrator 54 performs an integration of the amplified servo error signal and outputs an integrated servo error signal to the duty cycle modulation control 56. The duty cycle modulation control 56 calculates a new duty cycle for the switch 20 based on the integrated servo error signal. The duty cycle modulation control 56 outputs a gate signal to the switch driver 24 at a specific time to cause the switch 20 to close and supply power to the motor 14.

OPERATION

Referring now to FIGS. 1–3, the operation of system 10 will be described. The system 10 is designed to increase the efficiency of lightly loaded AC induction motors 14 by metering the power supplied to the AC motor 14 in order to reduce the power that contributes to motor heating and vibration. The system 10 increases the efficiency of the AC motor 14 by changing the duty cycle to optimize power usage for a given load.

The energy saving unit 12 determines the power factor for a given load. The power factor is calculated in the following manner. The A/D converter 28 supplies a time reference when the AC motor current crosses zero. The line voltage zero crossing detection circuit 30 and the line voltage zero crossing detection algorithm 40 supply a time reference when the AC power source line voltage passes through zero. The combination of the two times for voltage and current passing through zero is a measure of power factor. The microcontroller 22 calculates the power factor that the AC motor 14 is currently operating at by differencing the two times in the power factor detection circuit 44. The power factor is then used by the command generator 46 in a lookup table using data supplied by the serial EEPROM 26. The result of the lookup table is an output by the command generator 46 called the signal command. The difference between the motor signal (i.e., open switch voltage) and the signal command as outputted by the adder 50 reflects whether the A/C motor 14 requires more or less power. The adder 50 will produce a servo error signal reflective of the power difference. The servo error signal is processed by the progressive gain amplifier 52 which provides a gain ratio based on the magnitude of the servo error signal. The software integrator 54 integrates the output of the progressive gain amplifier 52 on a continuing basis. The output from the software integrator 54 is received by the duty cycle modulation control 56. The duty cycle modulation control 56 controls the firing or gating of the duty cycle of the switch 20. This determines where in the AC voltage waveform the switch 20 closes and conducts power to the AC motor 14. If the AC motor 14 is using more power than is needed, the duty cycle modulation control 56 will increase the duty cycle (off time) thereby reducing the power supplied to the AC motor 14. If the AC motor 14 needs more power, the duty cycle modulation control 56 will decrease the duty cycle (off time) thereby providing more power to the AC motor. Under full load, the output of the duty cycle modulation control 56 will be constantly driving the duty cycle to near zero (i.e., nearly no off time).

The system 10 is designed to be optimized for a variety of AC motors 14. The serial EEPROM memory 26 is programmable to enable loading of optimized control constants, i.e. the command profile constants and the control gain constants (FIG. 3). These control constants are used by the programming algorithm 42. Changing the control constants can have dramatic effects on the performance of the system 10 for a given AC motor 14.

The data to program the serial EEPROM memory 26 is sent from the data source 38 of the programmer 16 into the serial EEPROM memory 26 of the energy saving unit 12 using the concept listed below.

The programmer 16 controls the polarity of a switchable current source 32 between either a positive or a negative current value which is fed into the integrator 34. The output from the integrator 34 is a data voltage signal (DVS) which is fed into the energy saving unit 12 in place of the normal line voltage of the AC power source 18.

Both the programmer 16 and the energy saving unit 12 can detect and "read" the DVS signal that is taking the place of the AC power source line voltage. The energy savings unit 12 reads the DVS signal via the A/D converter 28. For data from the energy savings unit 12 to the programmer 16, the energy savings unit 12 controls the switch gate signal and hence has the ability to close the switch 20. When the switch 20 is closed, the integrator 34 in the programmer 16 is grounded. This allows the communication of the data from the energy saving unit 12 to the programmer 16.

The primary way that the programmer 16 communicates binary data to the energy saving unit 12 is by simply switching the switchable current source 32 from either a positive current to integrate a large positive DVS signal for a data high, or to a negative current to integrate a large negative DVS signal_for a data low. In contrast, the energy saving unit 12 communicates binary data to the programmer 16 by closing the switch 20 and grounding out the DVS signal from the integrator 34 to signify a data low or by leaving the switch 20 open to signify a data high.

For each data bit cycle, two data bits are sent from the programmer 16 to the energy savings unit 12. The first bit is sent to the serial EEPROM memory 26 when the serial EEPROM memory clock line is low. The second bit is sent to the serial EEPROM memory 26 when the serial EEPROM memory clock is high. This allows for the signaling of start and stop conditions required by the serial EEPROM memory 26.

On each and every bit cycle, the programmer 16 is resynchronized with the energy saving unit 12 when the energy saving unit 12 closes the switch 20. Furthermore, on each bit cycle, the energy saving unit 12 communicates the state of the serial EEPROM memory data by either closing the switch 20 to signify a data low, or leaving the switch 20 open to signify a data high.

The following enumerated list will detail the activities of both the programmer 16 and the energy saving unit 12 during a programing cycle:

1. (a) Energy saving unit 12 samples DVS signal.
    If DVS signal is high, set serial EEPROM memory Data high.
    If DVS signal is low, set serial EEPROM memory Data low.
   (b) Energy saving unit 12 pulses the switch gate signal to close the switch 20 and ground out DVS signal.
   (c) Programmer 16 senses DVS going to ground and re-synchronizes its timing based on that event.
   (d) Programmer 16 changes the polarity of the switchable current source 32 to release the switch 20.
2. (a) Energy savings unit 12 sets serial EEPROM memory clock high.
   (b) Programmer 16 checks output bit stream to see if the next bit is high or low.
    If bit is high, set switchable current source 32 positive, resulting in positive DVS signal.
    If bit is low, set switchable current source 32 negative, resulting in negative DVS signal.
3. (a) Energy Savings Device samples DVS signal.
    If DVS signal is high, set serial EEPROM memory data line to a high impedance logic high.
    If DVS signal is low, set serial EEPROM memory data line low.
   (b) Energy savings unit 12 sample serial EEPROM memory data line.
    If serial EEPROM memory data is high, leave switch 20 open.
    If serial EEPROM memory data is low, send gate signal to close switch 20.
   (c) After a short delay, the programmer 16 samples DVS signal.
    If DVS signal is at ground potential, set next bit in input bit stream low.
    If DVS signal is not at ground potential set next bit in input bit stream high.
   (d) Programmer 16 then switches polarity of switchable current source current to release the switch 20 (switch 20 could have been closed by low serial EEPROM memory 26 data).
4. (a) Energy savings unit 12 sets serial EEPROM memory clock low.
   (b) Programmer 16 checks output bit stream to see if the next bit is high or low.
    If bit is high, set switchable current source 32 positive, resulting in positive DVS signal.
    If bit is low, set switchable current source 32 negative, resulting in negative DVS signal.

Although the invention has been particularly shown and described with reference to a preferred embodiment thereof, it will be understood by those skilled in the art that changes in form and detail may be made therein without departing from the spirit and scope of the invention.

What is claimed is:

1. A system for increasing efficiency of an AC motor, comprising, in combination:

switching means coupled to said AC motor for controlling power supplied to said AC motor;

timer means coupled to said AC motor for monitoring a time when AC line voltage to said AC motor reaches zero volts;

A/D converter means coupled to said timer means for monitoring a time when AC line current to said AC motor reaches zero amps and for converting an AC open circuit voltage across said switching means from an analog measurement to a digital measurement, said digital measurement being indicative to power actually needed by said AC motor; and microcontroller means coupled to said timer means, to said A/D converter means and to said switching means for combining said time when AC line current reaches zero amps with said time when AC line voltage to said AC motor reaches zero volts and with said digital measurement provided by the A/D converter means to determine a servo error, for determining if said AC motor needs more power based on said servo error, for determining if said AC motor needs less power based on said servo error, and for providing a control signal to said switching means to supply the minimum power required.

2. The system of claim 1 further comprising memory means coupled to said microcontroller means for storing control constants to a specific model of said AC motor for optimization of said control signal from said microcontroller means to said switching means.

3. The system of claim 1 further comprising switch driver means coupled to said switching means for optically isolating said control signal from said AC line current and for amplifying said control signal to said switching means.

4. The system of claim 2 further comprising programmer means coupled to said switching means for programming said memory means with said control constants for a plurality of said AC motors wherein each of said AC motors utilizes different values of said control constants.

5. The system of claim 2 wherein said microcontroller means comprises:

power factor measuring means coupled to said A/D converter means and to said timer means for measuring power factors of said AC motor;

motor signal means coupled to said A/D converter means for providing a motor signal based on said digital measurement which is indicative to said power actually needed by said AC motor;

command signal generation means coupled to said power factor measuring means and to said memory means for calculating a command signal;

differencing means coupled to said command signal generation means and to said motor signal means for generating said servo error signal by differencing said command signal with said motor signal;

amplifier means coupled to said differencing means for progressively amplifying said servo error signal;

integrating means coupled to said amplifier means for mathematically integrating said progressively amplified servo error signal; and duty cycle means coupled to said integrating means and to said switching means for setting a duty cycle value based on said mathematically integrated progressively amplified servo error signal and for activating said switching means based on said duty cycle value.

6. The system of claim 4 wherein said programmer means comprises;

data source means for providing said control constants;

data translation means coupled to said data source means for translating and transferring a bi-directional data stream between said memory means and said data source means and for reading a data output from said memory means by monitoring and interpreting a state of said switching means; and switchable current source means coupled to said data translation means and to said switching means for writing a data input to said memory means by controlling said switchable current source means in response to said data source means and for providing a direction of current to said switching means to change a state of said switching means to an open condition to allow said microcontroller means to read and translate said data input for said memory means.

7. The system of claim 6 wherein said microcontroller means further activates said switching means to achieve clock synchronization between said microcontroller means, said memory means and said programmer means.

8. The system of claim 4 further comprising selection means coupled between said programmer means and said switching means for changing said system from a run state to a programming state.

9. A system for increasing efficiency of an AC motor, comprising, in combination:

switching means coupled to said AC motor for controlling power supplied to said AC motor;

timer means coupled to said AC motor for monitoring a time when AC line voltage to said AC motor reaches zero volts;

A/D converter means coupled to said timer means for monitoring a time when AC line current to said AC motor reaches zero amps and for converting an AC open circuit voltage across said switching means from an analog measurement to a digital measurement, said digital measurement being indicative of power actually needed by said AC motor;

microcontroller means coupled to said timer means, to said A/D converter means and to said switching means for combining said time when AC line current reaches zero amps with said time when AC line voltage to said AC motor reaches zero volts and with said digital measurement provided by the A/D converter means to determine a servo error, for determining if said AC motor needs more power based on said servo error, for determining if said AC motor needs less power based on said servo error, and for providing a control signal to said switching means to supply the minimum power required, said microcontroller means comprising:

power factor measuring means coupled to said A/D converter means and to said timer means for measuring power factors of said AC motor;

motor signal means coupled to said A/D converter means for providing a motor signal based on said digital measurement which is indicative of said power actually needed by said AC motor;

command signal generation means coupled to said power factor measuring means for calculating a command signal;

differencing means coupled to said command signal generation means and to said motor signal means for generating a servo error signal by differencing said command signal with said motor signal;

amplifier means coupled to said differencing means for progressively amplifying said servo error signal;

integrating means coupled to said amplifier means for mathematically integrating said progressively amplified servo error signal; and duty cycle means coupled to said integrating means and to said switching means for setting a duty cycle value based on said mathematically integrated progressively amplified servo error signal and for activating said switching means based on said duty cycle value;

memory means coupled to said microcontroller means for storing control constants to a specific model of said AC motor for optimization of said control signal from said microcontroller means to said switching means;

switch driver means coupled to said switching means for optically isolating said control signal from said AC line current and for amplifying said control signal to said switching means; and programmer means coupled to said switching means for programming said memory means with said control constants for a plurality of said AC motors wherein each of said AC motors utilizes different values of said control constants, said programmer means comprising;

data source means for providing said control constants;

data translation means coupled to said data source means for translating and transferring a bi-directional data stream between said memory means and said data source means and for reading a data output from said memory means by monitoring and interpreting a state of said switching means; and switchable current source means coupled to said data translation means and to said switching means for writing a data input to said memory means by controlling said switchable current source means in response to said data source means and for providing a direction of current to said switching means to change a state of said switching means to an open condition to allow said microcontroller means to read and translate said data input for said memory means; and selection means coupled between said programmer means and said switching means for changing said system from a run state to a programming state.

10. A method of providing a system for increasing efficiency of an AC motor, comprising, the steps of:

providing switching means coupled to said AC motor for controlling power supplied to said AC motor;

providing timer means coupled to said AC motor for monitoring a time when AC line voltage to said AC motor reaches zero volts;

providing A/D converter means coupled to said timer means for monitoring a time when AC line current to said AC motor reaches zero amps and for converting an AC open circuit voltage across said switching means from an analog measurement to a digital measurement, said digital measurement being indicative to power actually needed by said AC motor; and providing microcontroller means coupled to said timer means, to said A/D converter means and to said switching means for combining said time when AC line current reaches zero amps with said time when AC line voltage to said AC motor reaches zero volts and with said digital measurement provided by the A/D converter means to determine a servo error, for determining if said AC motor needs more power based on said servo error, for determining if said AC motor needs less power based on said servo error, and for providing a control signal to said switching means to supply the minimum power required.

11. The method of claim 10 further comprising the step of providing memory means coupled to said microcontroller means for storing control constants to a specific model of said AC motor for optimization of said control signal from said microcontroller means to said switching means.

12. The method of claim 10 further comprising the step of providing switch driver means coupled to said switching means for optically isolating said control signal from said AC line current and for amplifying said control signal to said switching means.

13. The method of claim 11 further comprising the step of providing programmer means coupled to said switching means for programming said memory means with said control constants for a plurality of said AC motors wherein each of said AC motors utilizes different values of said control constants.

14. The method of claim 11 wherein the step of providing said microcontroller means comprises the steps of:

providing power factor measuring means coupled to said A/D converter means and to said timer means for calculating power factors of said AC motor;

providing motor signal means coupled to said A/D converter means for providing a motor signal based on said digital measurement which is indicative to said power actually needed by said AC motor;

providing command signal generation means coupled to said power factor measuring means and to said memory means for calculating a command signal;

providing differencing means coupled to said command signal generation means and to said motor signal means for generating a servo error signal by differencing said command signal with said motor signal;

providing amplifier means coupled to said differencing means for progressively amplifying said servo error signal;

providing integrating means coupled to said amplifier means for mathematically integrating said progressively amplified servo error signal; and providing duty cycle means coupled to said integrating means and to said switching means for setting a duty cycle value based on said mathematically integrated progressively amplified servo error signal and for activating said switching means based on said duty cycle value.

15. The method of claim 13 wherein the step of providing said programmer means comprises the steps of;

providing data source means for providing said control constants;

providing data translation means coupled to said data source means for translating and transferring a bi-directional data stream between said memory means and said data source means and for reading a data output from said memory means by monitoring and interpreting a state of said switching means; and providing switchable current source means coupled to said data translation means and to said switching means for writing a data input to said memory means by controlling said switchable current source means in response to said data source means and for providing a direction of current to said switching means to change a state of said switching means to an open condition to allow said microcontroller means to read and translate said data input for said memory means.

16. The method of claim 15 wherein the step of providing said microcontroller means further comprises the step of providing activation of said switching means to achieve clock synchronization between said microcontroller means, said memory means and said programmer means.

17. The method of claim 13 further comprising the step of providing selection means coupled between said programmer means and said switching means for changing said system from a run state to a programming state.

* * * * *